(12) United States Patent
Deco et al.

(10) Patent No.: US 6,980,689 B1
(45) Date of Patent: Dec. 27, 2005

(54) PATTERN RECOGNITION

(75) Inventors: Gustavo Deco, Neubiberg (DE); Bernd Schuermann, Haimhausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/979,677

(22) PCT Filed: May 11, 2000

(86) PCT No.: PCT/DE00/01481

§ 371 (c)(1),
(2), (4) Date: Nov. 26, 2001

(87) PCT Pub. No.: WO00/73979

PCT Pub. Date: Dec. 7, 2000

(30) Foreign Application Priority Data

May 26, 1999 (DE) ................................ 199 24 009

(51) Int. Cl.[7] ............................................. G06K 9/00
(52) U.S. Cl. ..................... 382/153; 382/190; 706/20
(58) Field of Search ............................... 382/103, 153, 382/156, 190, 291, 181, 155, 209, 203, 318, 382/259; 706/15, 21, 52, 25, 18, 27, 40, 20

(56) References Cited

U.S. PATENT DOCUMENTS

| | | | |
|---|---|---|---|
| 5,014,219 A | | 5/1991 | White ........................ 706/25 |
| 5,224,179 A | * | 6/1993 | Denker et al. .............. 382/259 |
| 5,490,225 A | * | 2/1996 | Kumagai .................... 382/227 |
| 5,657,251 A | * | 8/1997 | Fiala .......................... 342/162 |
| 5,867,386 A | * | 2/1999 | Hoffberg et al. ............. 700/83 |
| 6,115,480 A | * | 9/2000 | Washizawa ................. 382/103 |

FOREIGN PATENT DOCUMENTS

EP        0 578 558 A1        1/1994

OTHER PUBLICATIONS

Pierre Van De Laar et al., "Task Dependent Learning of Attention", Neural Networks, vol 10 pp. 981-992, 1997.*
Fukushima, Kunihiko, "Neocognitron: A Hierarchical Neural Network Capable of Visual Pattern Recognition" Neural Networks, vol. 1, No. 2, 1988, pp. 119-130.
Young S.S. et al.: "Foveal Automatic Target Recognition Using a Neural Network" Proceedings of the International Conference on Image Processing (ICIP), Sep. 16, 1996, pp. 303-306.

(Continued)

*Primary Examiner*—Sanjiv Shah
*Assistant Examiner*—Sheela Chawan
(74) *Attorney, Agent, or Firm*—Staas & Halsey LLP (57) ABSTRACT

The present invention relates to a system and a method for recognizing a prescribed object, having a storage device for storing attribute information relating to the prescribed object, detecting means for detecting attributes in a detection range and for outputting corresponding detection information, first processing means for processing, in parallel and separately for each possible attribute type, the detection information for the detection means by using the attribute information from the storage device and for outputting corresponding processing information, and second processing means for processing the process information from the first processing means and for outputting the information for determining the position of the prescribed object in the detection range.

5 Claims, 7 Drawing Sheets

OTHER PUBLICATIONS

Yu, Y. et al.: "An Active Model-based Algorithm for Correspondence and Estimation of Pose Parameters of Objects", International Conference on Systems, Man and Cybernetics, Oct. 22, 1995, pp. 269-274.

Treisman, A. et al., "Conjuction Search Revisited", Journal of Experimental Psychology: Human Perception and Performance, vol. 16, No. 3, 1990, pp. 459-478.

Usher, M. et al., "Modeling the Temporal Dynamics of IT Neurons in Visual Search: A Mechanism for Top-down Selective Attention", Journal of Cognitive Neuroscience, vol. 8, No. 4, pp. 311-327.

Van de Laar, P. et al., "Task-Dependent Learning of Attention", Neural Networks, vol. 10, No. 6, 1997, pp. 981-992.

* cited by examiner

PATTERN RECOGNITION

CROSS REFERENCE TO RELATED APPLICATIONS

This application is based on and hereby claims priority to German Patent Application No. 19924009.4 filed on May 26, 1999, the contents of which are hereby incorporated by reference.

BACKGROUND OF THE INVENTION

1. Field of the Invention

The present invention relates to a technically implementable method for searching for a reference pattern in a search field.

2. Description of the Related Art

Pattern in the sense of the present description is understood as any two- or multidimensional representation of physical variables or general sensory information. A pattern in this sense can therefore be characterized by a two- or multidimensional matrix of predetermined parameters. A corresponding statement also holds for the search field which thereby constitutes a two- or multidimensional representation of physical variables or sensory information. The aim is to use the reference pattern in the search field by using the pattern searching method. In this case, in addition to the reference pattern it is also possible for other, partially very similar patterns, which are termed distracters, to be present in the search field.

It is known from the prior art to utilize findings from neurosciences (neuroinformatics, neurobiology) with regard to an efficient search operation, since biological neurosystems such as, for example, the human brain generally accomplish pattern searching tasks efficiently.

The following text states the prior art, which constitutes various approaches known from the neurosciences.

Two principle types of search or recognition are distinguished, specifically the attribute search and the conjunction search (compare A. Treisman and S. Sato, "conjunction search revisited", Journal of Experimental Psychology; Human Perception and Performance, 16, 459–478). In the case of an attribute searching task, the target object is distinguished from the distracters by only one respectively identical attribute type (termed parameter below), for example only in shape. It is to be noted here that in the following description the term parameter characterizes, for example, the shape, color or size of a pattern, for example large and small for the size parameter, triangular, rectangular and round for the shape parameter etc., which represent values which the parameters can assume. These values are represented in a coded fashion in the case of a technical implementation, for example by logic signals.

In a conjunction searching task, the distracter objects are combined into various groups. The target pattern is distinguished from each distracter group by one parameter, but not from all distracter groups by the same parameter. It is possible, for example, to distinguish between a standard and a triple conjunction search. In a standard conjunction search, there are two distracter groups, which have two parameters in each case, and the target pattern has in each case a parameter value common to each distracter group. In a triple conjunction search, the target pattern can be distinguished from all distracter groups by one or more parameters.

A model has been proposed in which there is initiated after a first parallel search a competitive search which is terminated by the recognition of only a single pattern, specifically the target object (M. Usher and E. Niebur, "Modeling the temporal dynamics of IT neurons in visual search: A mechanism for top-down selective attention", Journal of Cognitive Neuroscience, 8, 311–327). The model is based in this case of a neuro approach for object-orientated recognition, various visual stimulation values such as, for example, shape, color, size etc. being represented by mutually competing cell arrangements which are mutual inhibitory.

A disadvantage of the prior art set forth above is that available solutions for technical realization or implementation of the pattern searching operation do not play a role in this case. This problem exists in general when an appeal is made to non-technical fields such as neurobiology, when implementing technical systems.

SUMMARY OF THE INVENTION

It is therefore an object of the present invention to provide a technique for pattern searching which can be realized efficiently in technical terms. The efficiency of biological systems should be obtained overall as far as possible in this case.

A particular application of the method according to the invention is in automated searching of objects which are to be picked up by a robot, based on a reference pattern representing an object in this case. In this application, it is possible, for example, for objects which are to be picked up by the robot to pass by on a conveyor belt in the region of a robot arm.

Thus, a method is proposed for searching a reference pattern in a search field. The reference pattern is characterized in this case by predetermined parameters. At least one topographic map of the search field is generated per parameter. Levels at the respective positions of the topographic map are in this case a function of the value of the corresponding parameter at the corresponding position in the search field. The levels of the topographic map are varied as a function of the values of the parameters of the reference pattern. A dynamic variation of the topographic map therefore takes place. The respective levels of each position of the varied topographic maps are combined for the purpose of generating a combined topographic map. The reference pattern is then considered to be found at that position of the search field which corresponds to that position of the combined topographic map which has the highest level.

The method set forth above can be executed completely in a parallel or quasi-parallel fashion. The method advantageously has no sort of return loop, and this renders the technical realization less complicated. The dynamics of the method resides in the respective variation in the level of the topographic maps. This variation takes place separately for each parameter. This also is attended by advantages by comparison with a realization with the aid of a return loop, in which all the method steps must be run through again at each iteration step.

One group comprising a plurality of topographic maps of the search field can be generated per parameter. A topographic map is generated for each value which the corresponding parameter can assume.

The variation in the level of the topographic maps is a function of the values of the parameters of the reference pattern can be performed by mutual interaction of the topographic maps of a group in each case.

In the step of varying the levels of the topographic maps, the levels of the topographic maps can be varied as a function of their correspondence in each case with the actual values of the parameters of the reference pattern.

The generation of the topographic maps can be performed by a parallel or pseudo- parallel (quasi-parallel) processing of the information of the search field.

The levels of the combined topographic map can also be varied dynamically, levels which are above a predetermined limiting value being increased, and levels which are smaller than or equal to the predetermined limiting value being reduced. In a final stage, the levels of the combined topographic map can therefore converge to the effect that only one position still has a determined level.

A preferred application of the present invention is to be found in robotics. For example, objects which are to be picked up by a robot can be automatically searched for by the method in an automated fashion. In other words, the reference pattern constitutes an object to be picked up.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
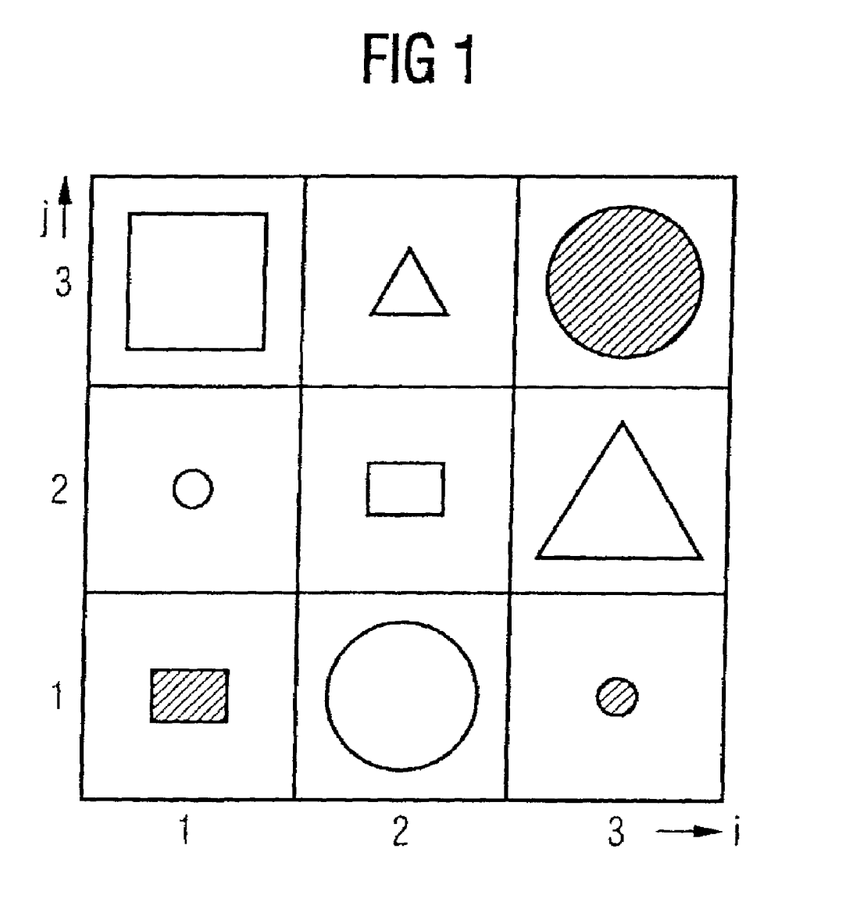
FIG. 1 is an example of a search field with a plurality of patterns from which a reference pattern is to be found.

A search field with a plurality of patterns is illustrated in FIG. 1, the intention being to find one of the patterns. The search field is split up, for example, into nine sections, each section being defined by a horizontal co-ordinate i (i=1, 2, 3) and a vertical coordinate j (j=1, 2, 3). Each section of the search field of the example shown in FIG. 1 maintains a pattern. Each pattern is characterized by K parameters, in the present example by the three parameters of shape, size and color. The first parameter (k=1) of color, can assume L=3 parameter values, specifically triangular, rectangular and round. The second parameter (k=2) of size can assume L=2 values, specifically large and small, and the third parameter (k=3) of color can assume L=2 values of white and black, the value of black being represented in FIG. 1 by hatching of the respective objects.

Thus, the pattern illustrated by the example in section (1=1, j=1) is characterized by the parameter values of rectangular, small and black, the pattern in section (i=3, j=2) is characterized by the parameter values of triangular, large and white, etc. The search for a reference pattern is illustrated diagrammatically in FIG. 2, the search field with nine sections shown in FIG. 1 being used as a basis by way of example. The search system comprises detection means 2 which detect the parameter values of the patterns in the search field, and output corresponding detection information to first processing means 3. In the example illustrated in FIG. 2, the search system comprises nine detection means 2, which are assigned in each case to a section(i, j) of the search field illustrated in FIG. 1. In the example illustrated, each detection means 2, which can, for example, be photodetector, an infrared detector or the like therefore detects the parameter values of the pattern arranged in the corresponding section of the search field. The detecting means 2 can thus simultaneously detect in each case the three parameters of shape, size and color. Alternatively each section of the detection region can be assigned a respective detecting means 2 for each parameter, such that in the example illustrated in FIG. 2, for example, each section (i, j) of the detection range can be scanned by three detection means 2 for the size, the shape and the color of the object, in each case. As a further alternative, it would be possible for each section of the search field to be assigned a multiplicity of detecting means.

Figure 2:
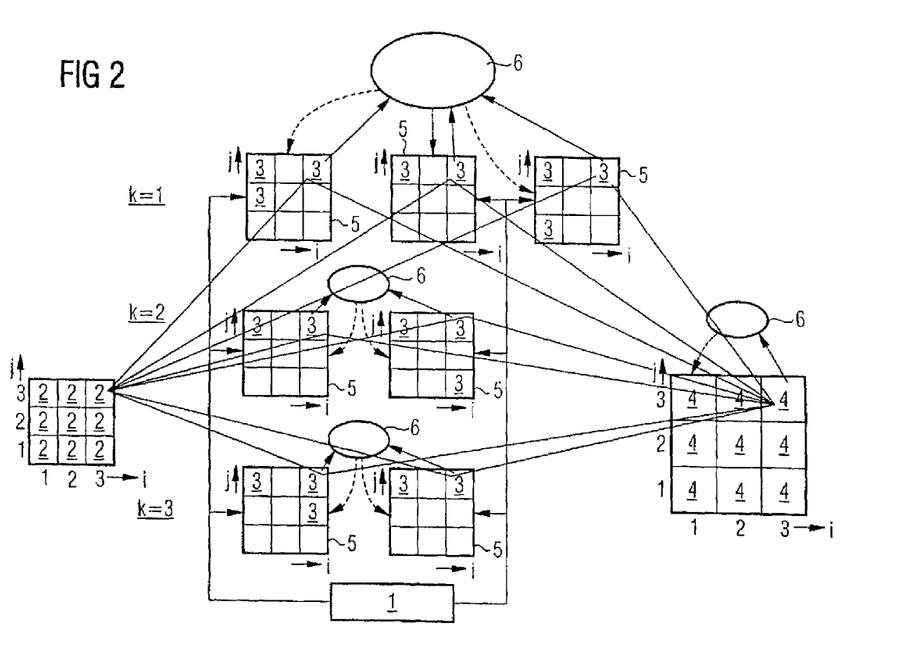
FIG. 2 is a diagrammatic illustration of the search for a reference pattern.

The first processing means 3 processes the detection information from the detection means 2 in parallel or quasi-parallel and separately for each parameter, by making use of parameter information from the storage device 1. The parameter information in the storage device 1 includes the parameter values of the reference pattern, which is to be found in the search field. The processing, separate for each parameter, of the detection information by the first processing means 3 is illustrated in FIG. 2 by splitting up the first processing means 3 into three parameter networks (k=1, k=2 and k=3), each parameter network being subdivided in turn into parallel subnetworks 5 for each parameter value of the corresponding parameter. Each parameter network therefore constitutes a topographic map of the search field with reference to the corresponding parameter.

The first parameter network (k=1), which is assigned, for example, to the parameter value of size for the example shown in FIG. 1, therefore includes three parallel subnetworks 5, one for each of the three possible parameter values of rectangular, triangular and round. The other parameter networks (k=2, k=3) correspondingly likewise have two subnetworks 5.

It is to be noted that the terms of parameter network and subnetwork relate to their construction as neuronetwork, each first processing means of the subnetworks 5 being constructed in the manner of a collection of completely interconnected excitatory neurons. As may be seen from the scheme in FIG. 2, in this case each first processing means 3 or each collection of neurons is assigned to a corresponding section of the search field such that in the present example each subnetwork 9 has first processing means 3 which correspond in the corresponding sections (i, j) of search field.

The first processing means 3 or the respective collections of neurons within each subnetwork 5, and the subnetworks 5 within a respective parameter network are intercoupled in the manner of an inhibitory link 6, something which can be illustrated by a pool of inhibitory neurons. In this case, the links illustrated in the scheme of FIG. 2 with the aid of continuous lines are excitatory, and the links shown with the aid of dashed lines are inhibitory. Each parameter network therefore has an independent pool of inhibitory neurons, and this corresponds in a neurophysiological comparison to the fact that the response of neurons which are sensitive to a specific parameter is amplified, and the activity of the other neurons, which are sensitive to other parameters, is suppressed.

Each first processing means 3 in each subnetwork 5 is assigned to a corresponding section of the search field, that is to say the first processing means 3 in each subnetwork are topographically ordered or, in terms of a comparison, the receptive field of neurons which are assigned to a specific section are sensitive to the detection information detected at the corresponding section of the search field. It is to be noted here that each detection means 2 is connected to each first processing means 3. In the scheme illustrated in FIG. 2, this means that each first detection means 3 receives detection information from each of the nine detection means 2. Furthermore, each first processing means 3 receives the parameter information relating to the reference pattern from the storage device 1.

The second processing means 4 process the processing information from the first processing means 3 and output information which serves to determine the assumed position of the reference pattern in the search field. The second processing means 4 are likewise constructed in the manner of a neuron network, processing information from various sections of the search field being processed in a parallel or quasi-parallel fashion. In each case, a second processing means 4 is respectively assigned to a section of the search field and receives processing information respectively only from the first processing means 3, which are assigned to the same section, as may be seen from the scheme in FIG. 2.

In other words, this means that the second processing means 4, which is assigned to the section (i=3, j=3), receives processing information exdusively from the first processing means 3, which are likewise assigned to the section (i=3, j=3) of the search field. Like the first processing means 3, the second processing means 4 are respectively constructed, in terms of a comparison, in the manner of a collection of completely interconnected excitatory neurons which are intercoupled in the manner of an inhibitory link 6. The second processing means 4 constructed in such a way in the manner of a raster or a layer thus correspond to the model of IT (inferrotemporal) neurons which exhibit a position-specific increase in the activity by suppressing the responses of the collections assigned to other positions. A corresponding statement holds for the subnetworks 5 of the first processing means 3.

This configuration of the second processing means 4 corresponds to a dynamic construction of a focused attentiveness without the explicit assumption of a focusing mechanism. Top-down information in the form of parameter values, stored in the storage device 1, of the reference pattern are, as it were, fed by corresponding excitatory links between the storage device 1 and each first processing means 3. The detection information and parameter information are processed in this case by the first processing means 3 and the second processing means 4 for each section of the search field in a parallel or quasi-parallel fashion, a longer reaction time corresponding to a slower dynamic convergence on all layer planes, that is to say to the subnetworks 5 and the higher-order layer consisting of higher-order processing means 4.

Presented below is a set of differential equations by which the dynamic behavior of the search operation can be characterized. Assuming an ergodic response, use is made of the so-called mean-field approximation to derive a dynamic system of equations for the activity levels of the collections of neurons forming the first and second processing means 3 and 4 respectively. The basic idea consists in representing each arrangement of neurons by the respective activity x and an input current I which is characteristic of all the arrangements of neurons, in which case it holds that:

$$x = F(I) = \frac{1}{T_r - \tau \log\left(1 - \frac{1}{\tau I}\right)},$$

F(I) being the response function, which converts the input current I into discharging or activity rates for a neuron (integrate and fire spiking neuron) having a deterministic input, a time membrane constant τ and an absolute refractory time $T_r$.

The system of differential equations which describe the dynamic behavior of the subnetworks 5 is:

$$\tau \frac{\partial}{\partial t} I_{ijkl}(t) = -I_{ijkl}(t) + aF(I_{ijkl}(t)) - bF(I^P_k(t)) + I_0 + I^F_{ijkl} + I^A_{kl} + v,$$

$$\tau_P \frac{\partial}{\partial t} I^P_k(t) = -I^P_k(t) + c\sum_{i=1}^{S}\sum_{j=1}^{S}\sum_{l=1}^{L(k)} F(I_{ijkl}(t)) - d\,F(I^P_k(t))$$

$I_{ijkl}(t)$ being the input current for the neuron collection with a receptive field in the case of section ij of the parameter network k, in which the parameter value I is analyzed, $I^P_k(t)$ being the current in the inhibitory pool, which is coupled to the subnetworks 5 of the parameter k, and S representing the framework variable (size of the search field). $I_0$ is a diffuse spontaneous background input signal, $I^F_{ijkl}$ is the sensory input, that is to say the detection information signal from the detection means 2 to the first processing means 3 in the parameter network k, which are sensitive to the parameter value I and have receptive fields in section ij of the search field, this input characterizing the presence of the corresponding parameter value on the corresponding section, and $I^A_{kj}$ being the parameter information from the storage device 1. v is the additive Gauss noise, τ the synaptic time constant for the excitatory links, and $\tau_P$ the synaptic time constant for the inhibitory links, a, b, c and d are the synaptic ratings. The following values were used in the case of the simulation results illustrated in FIGS. 3 to 6: v=0.002, τ=5, $\tau^P$=20, a=0.95, b=0.8, c=2.0, d=0.1, $I_0$=0.025. The value 0.05 was assumed for $I^F_{ijkl}$ in the presence of the corresponding parameter value I, and the value 0 was assumed in the absence of the corresponding parameter value I. For the parameter information $I^A_{kj}$, a value of 0.005 was assumed for the subnetworks 5 which analyze the corresponding parameter values of the reference pattern, and a value of 0 was assumed for other subnetworks.

The following system of differential equations is used for the dynamic properties of the second processing means 4 in the higher-order processing layer:

$$\tau_H \frac{\partial}{\partial t} I^H(t) =$$

$$-I_{ij}(t) + \hat{a}F(I_{ij}(t)) - \hat{b}F(I^{PH}(t)) + I_0 + \hat{w}\sum_{k=1}^{K}\sum_{l=1}^{L(k)} F(I_{ijkl}(t)) + v,$$

-continued $$\tau_{PH} \frac{\partial}{\partial t} I^{PH}(t) = -I^{PH}(t) + \hat{c} \sum_{i=1}^{S} \sum_{j=1}^{S} F(I_{ij}^{H}(t)) - \hat{d} F(I^{PH}(t))$$

$I^{H}_{ij}(t)$ being the input current for the neuron collection with a receptive field in the case of section ij, $I^{PH}$ being the corresponding current of the inhibitory pool, $\tau_H$ being the synaptic time constant for the excitatory links, $\tau_{PH}$ being the synaptic time constant for the inhibitory links, and â, b̂, ŵ, ĉ and d̂ being the synaptic ratings. The following values were assumed for the simulation results of FIG. 3 and FIG. 7: $\tau_H$=5, $\tau_{PH}$=20, â=0.95, b̂=0.8, ŵ=1,0, ĉ=1.0 and d̂=0.1.

The above system of differential equations was integrated numerically for the simulations shown in FIGS. 3 to 7, until a convergence criterion was reached. This convergence criterion consisted in the fact that the neurons in the second processing means 4 are the corresponding higher-order processing layer are polarized, something which corresponds to the following condition:

$$F(I^{H} i_{max} j_{max}(t)) - \frac{1}{(S-1)(S-1)} \sum_{i \neq i_{max}} \sum_{j \neq j_{max}} F(I_{ij}^{H}(t)) > \theta,$$

the index $i^{max} j_{max}$ characterizing the neuron arrangement of the second processing means 4 of the higher-order layer with maximum activity, and the threshold value having been assumed as θ=0.1. The second term on the left-hand side of the above equation corresponds to the mean distracter activity.

For each parameter, the fixed point of the dynamic behavior is given by the activity of the neuron arrangements in the sublayers with the same parameter value as the reference pattern, and in correspondence with distracter objects which have this parameter value. If, for example, the reference pattern is red, in a parameter network for color, the activity of the sublayer 5 assigned to the parameter value of green is suppressed and the neuron arrangements corresponding to red distracter objects are amplified. In the higher-order layer of the second processing means 4, the neuron arrangements, which correspond to sections ij, which undergo maximum activation in all parameter networks, while the others are suppressed. In other words, the second processing means, which corresponds to section ij and shows all the parameter values which are stimulated and required in accordance with the parameter information of the reference pattern, is activated more strongly, as a result of which the corresponding section ij of the search field is determined as that section in which the reference pattern is located.

Figure 3:
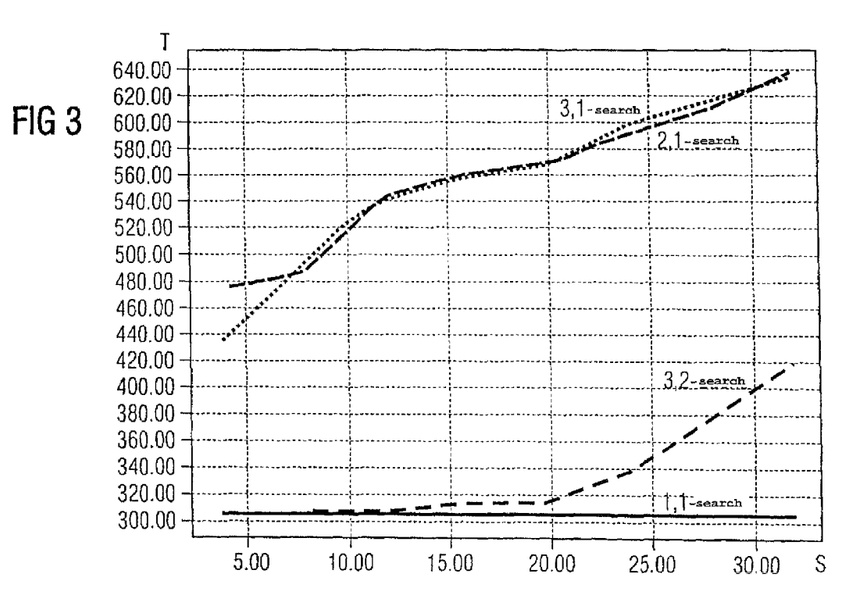
FIG. 3 is a graph, obtained by simulation, of the search time as a function of the framework variable for different search times.

Simulation results which were determined by using the above differential equations with the specified parameter values are illustrated in FIGS. 3 to 7. FIG. 3 shows the search time T as a function of the framework variable S for various types of search. The various types of search are characterized as m, n search by a pair of numbers m and n in each case, m being the number of parameters by which the distracter patterns differ from the reference pattern, and n being the number of parameters by which all the distracter groups differ simultaneously from the reference pattern. In other words, the search addressed above corresponds to a 1,1 search, a standard link search corresponds to a 2,1 search and a triple link search can be a 3,1 or 3,2 search depending on whether the reference pattern differs from all the distracter groups in one or two parameters.

In the case of the simulation results shown in FIGS. 3 to 7, it was assumed that the patterns in the search field are defined by three parameters, for example color, size and shape, each parameter being capable of assuming two parameter values. The experiment was repeated one hundred times for each search, in each case with different random generated distracters and referenced patterns. Illustrated in FIG. 3, as a result, is the mean value T of the hundred simulated reaction times in ms, as a function of the framework S for a 1,1 search, a 3,2 search, a 2,1 search and a 3,1 search. The gradient of the reaction time with respect to the framework variable is absolutely consistent with the existing experimental results. In accordance with the experimental results, the simulation result of FIG. 3 shows for the 1,1 search that the reference pattern is detected by a parallel processing in the overall search field. Furthermore, the simulation results shown in FIG. 3 show for the standard link search and the triple link search that the reaction time is a linear function of the size of the search field, the gradient of the triple link search for the 3,1 search being somewhat steeper, and that for the 3,2 search being substantially flatter than the 2,1 search or standard search.

Figure 4:
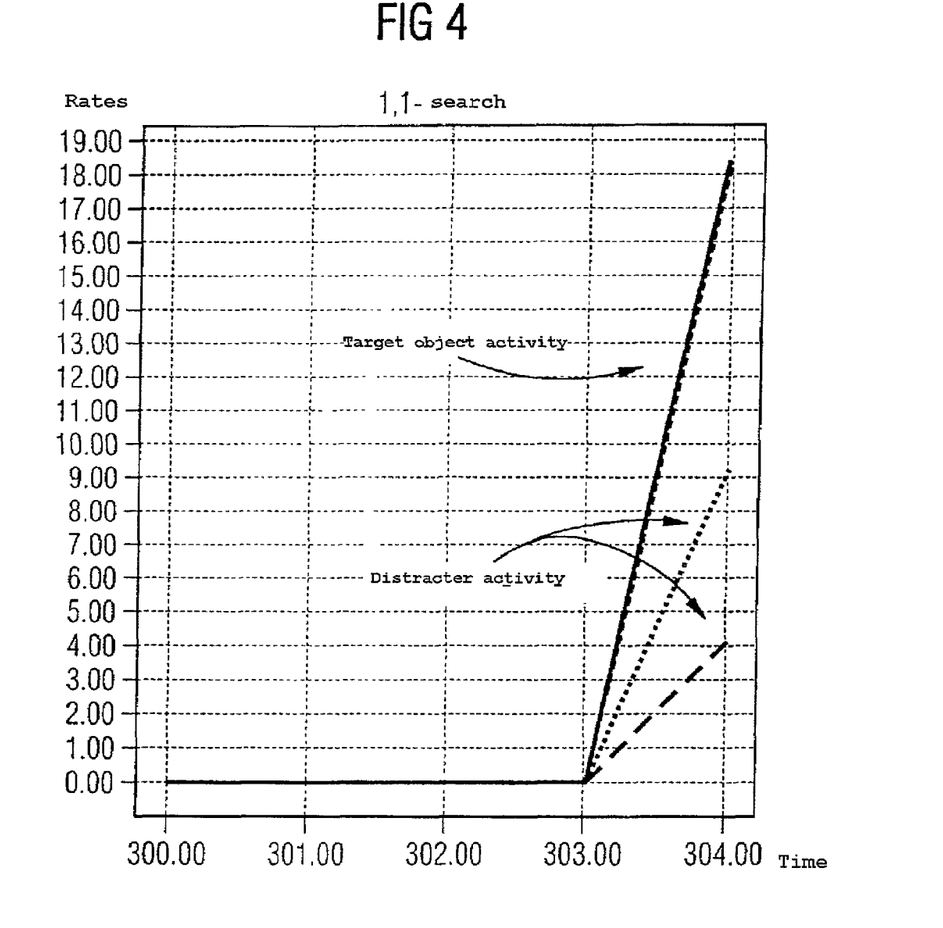
FIGS. 4, 5 and 6 are graphs of various activity rates as a function of the time for various type of search in the first processing devices as simulation results.
Figure 5:
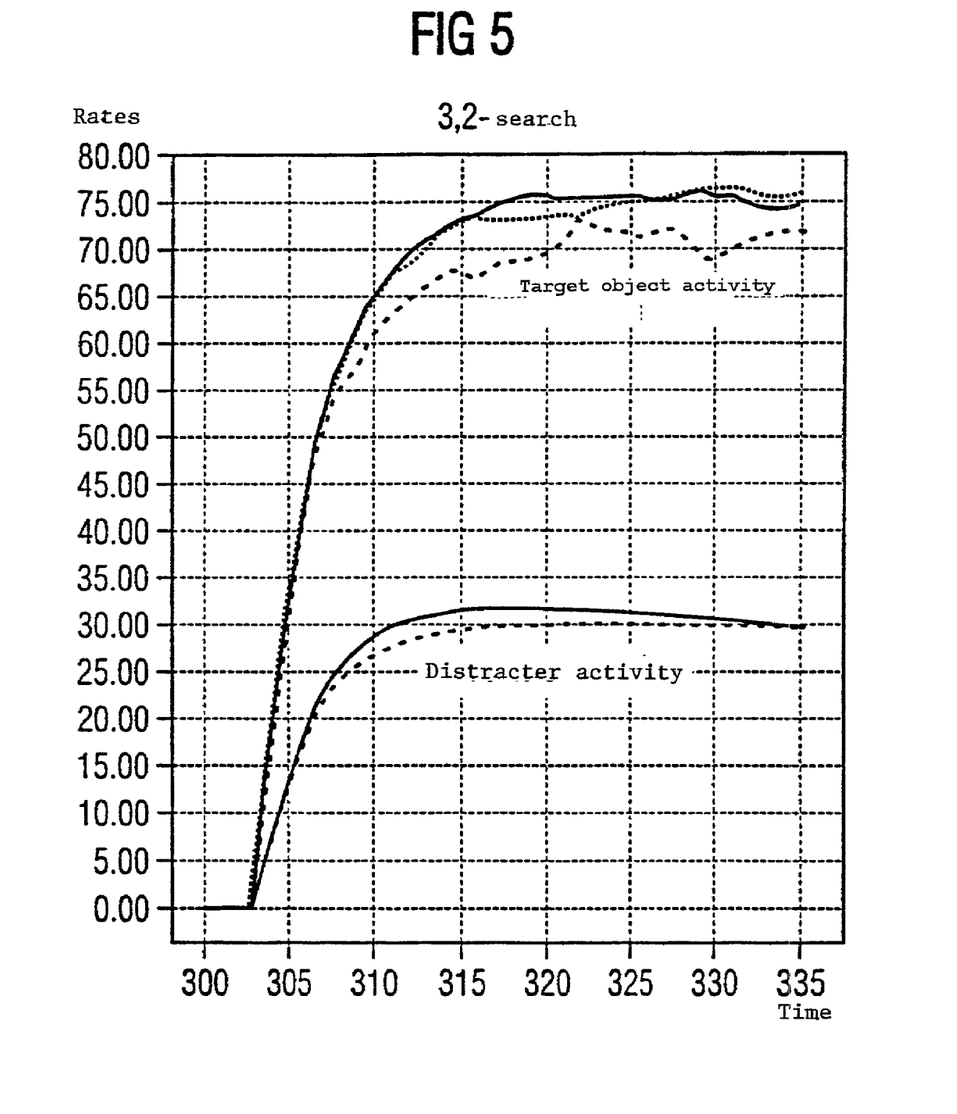
Figure 6:
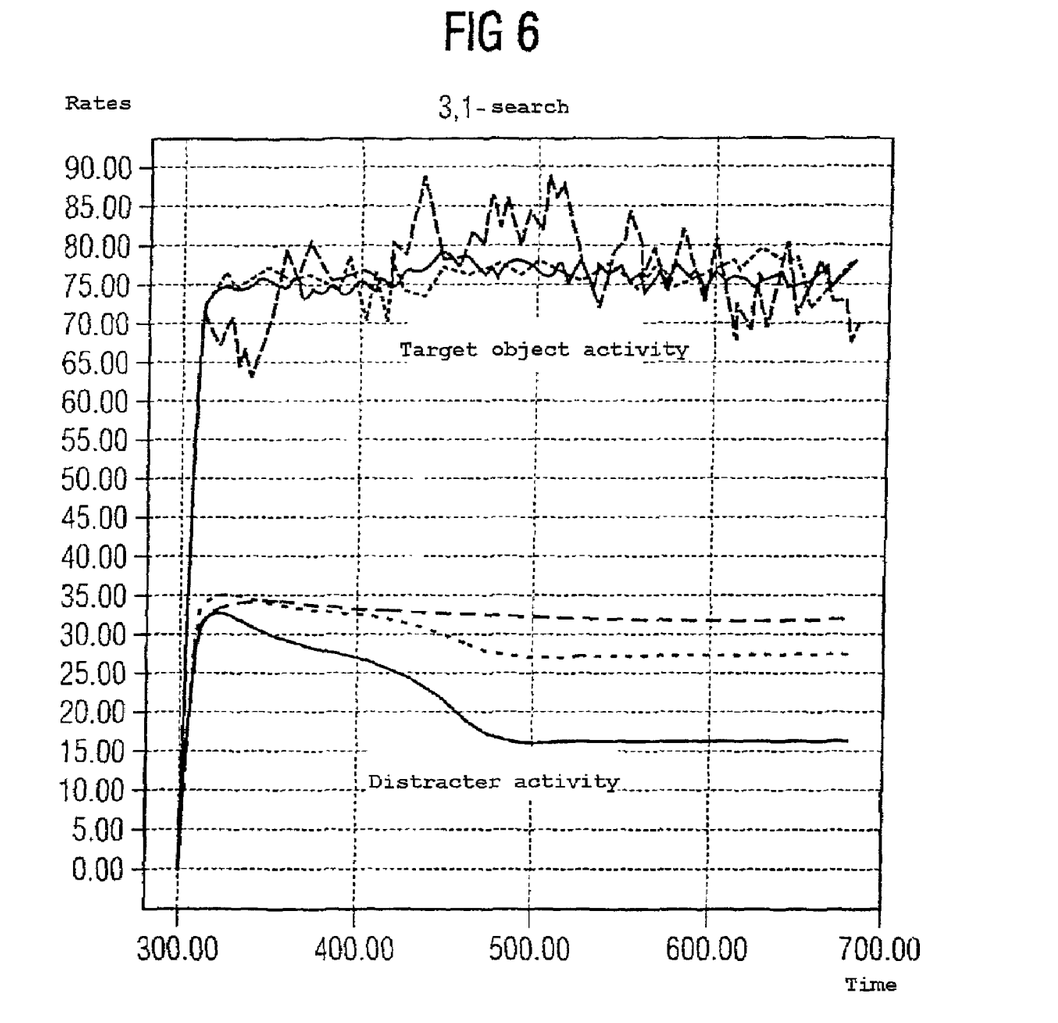
Figure 7:
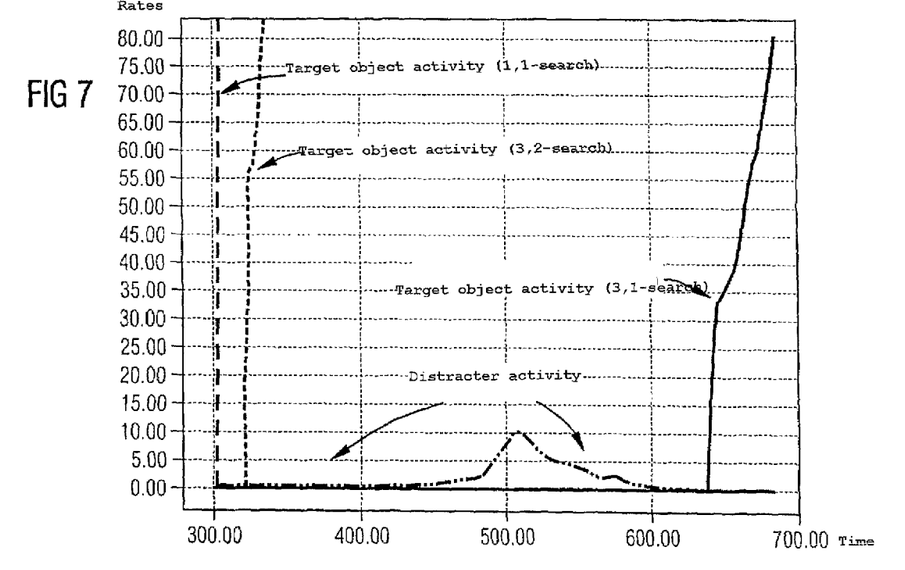
FIG. 7 is a graph of various activity rates as a function of the time of various type of search in the second processing devices as simulation results.

The activity rates in the individual parameter networks which are given by the three branches of the first processing means 3 are illustrated in FIGS. 4 to 6, illustrated correspondingly in each of the figures three curves for the reference pattern activity and three curves for the distracters. FIG. 4 shows a simulation result for a 1,1 search, FIG. 5 shows the simulation result for a 2,2 search, and FIG. 6 shows the simulation result for a 3,1 search. It is to be seen that in the case of the 1,1 and 3,2 searches the convergence times appear to be very slight in all parameter networks, and these types of search therefore appear as searches with parallel processing. In the case of the 3,1 search, the delay in the dynamic response requires more time, and this type of search therefore appears as a search with serial processing, although the basic processing mechanism operates in a parallel fashion. In this case (FIG. 6), the competition present within each parameter network, that is to say for each parameter, delays the convergence of dynamic response for each parameter and, as a consequence of this, also in the higher-order network or the higher-order layer of the second processing means 4. Reference may be made to the slow suppression of the distracter activity in FIG. 6, which illustrates the fundamental competition. FIG. 7 shows the resulting activity rates plotted against time in the higher-order network or the higher-order layer of the second processing means 4 for the same simulation values, which also form the basis of FIGS. 3 to 6. The delayed attainment of the convergence criterion in the 3,1 search is clearly to be seen in FIG. 7.

The invention has been described in detail with particular reference to preferred embodiments thereof and examples, but it will be understood that variations and modifications can be effected within the spirit and scope of the invention.

What is claimed is:

1. A method for searching in a search field for a reference pattern characterized by prescribed parameters, said method comprising:

separately generating a group of topographic maps of the search field for each parameter, a topographic map being generated for each value which a corresponding parameter can assume, having levels at respective positions determined by a function of a value of the corresponding parameter at a corresponding position in the search field;

varying the levels of the topographic maps as a function of values of the prescribed parameters of the reference pattern by mutual interaction of the topographic maps of each group;

combining the levels of corresponding positions of the topographic maps to produce a combined topographic map; and determining that the reference pattern has been found at a position of the search field which corresponds to a position of the combined topographic map having a highest level.

2. The method as claimed in claim 1, wherein said varying produces the levels of the topographic maps as a function of a correspondence with actual values of the parameters of the reference pattern.

3. The method as claimed in claim 1, wherein said generating of the topographic maps is performed by one of parallel and pseudo-parallel processing of information in the search field.

4. The method as claimed in claim 1, further comprising dynamically varying levels of the combined topographic map by increasing levels above a predetermined limiting value and reducing levels no larger than the predetermined limiting value.

5. The method as claimed in claim 1, wherein the reference pattern represents an object to be picked up by a robot.

* * * * *

UNITED STATES PATENT AND TRADEMARK OFFICE
CERTIFICATE OF CORRECTION

PATENT NO. : 6,980,689 B1
APPLICATION NO. : 09/979677
DATED : December 27, 2005
INVENTOR(S) : Gustavo Deco et al.

It is certified that error appears in the above-identified patent and that said Letters Patent is hereby corrected as shown below:

Column 1, line 41, change "Psychology;" to --Psychology:--.
Column 3, line 51, change "coordinate" to --co-ordinate--; and
        line 63, change "(1=1," to --(i=1,--.
Column 5, line 32, change "ecdusively" to --exclusively--.
Column 6, line 30, change "$I^D_k(t)$" to --$I^P_k(t)$--;
        line 42, change "$I^A_{kj}$" to --$I^A_{kl}$--;
        line 47, change "$\tau^p=20$," to -- $\tau_p=20$,--; and
        line 52, change "$I^A_{kj}$," to --$I^A_{kl}$,--.
Column 7, line 30, change "$i^{max}j_{max}$" to --$i_{max}j_{max}$--.

Signed and Sealed this

Third Day of October, 2006

JON W. DUDAS
*Director of the United States Patent and Trademark Office*